US009146565B2

(12) United States Patent
Ware et al.

(10) Patent No.: US 9,146,565 B2
(45) Date of Patent: Sep. 29, 2015

(54) APPARATUS FOR REGULATING FLUID FLOW FROM A RESERVOIR (76) Inventors: Leslie Dale Ware, Dallas, TX (US); Orlin Dale Ware, Dallas, TX (US)

( * ) Notice: Subject to any disclaimer, the term of this patent is extended or adjusted under 35 U.S.C. 154(b) by 499 days.

(21) Appl. No.: 13/613,260

(22) Filed: Sep. 13, 2012

(65) Prior Publication Data
US 2014/0069528 A1  Mar. 13, 2014

(51) Int. Cl.
G05D 9/12 (2006.01)
G05D 7/06 (2006.01)
G05D 16/20 (2006.01)

(52) U.S. Cl.
CPC ............... *G05D 7/0635* (2013.01); *G05D 9/12* (2013.01); *G05D 16/202* (2013.01); *Y10T 137/7761* (2015.04); *Y10T 137/7762* (2015.04)

(58) Field of Classification Search
CPC .................. Y10T 137/7761; Y10T 137/7762; G05D 7/0635; G05D 16/2013; G05D 16/202; G05D 9/12
USPC .................. 137/487.5, 488; 251/61.1; 404/2; 405/40; 138/93
See application file for complete search history.

(56) References Cited

U.S. PATENT DOCUMENTS

| 1,318,656 | A |   | 10/1919 | Fitz Gerald |          |
|-----------|---|---|---------|-------------|----------|
| 2,930,396 | A |   | 3/1960  | Weisman et al. |       |
| 2,975,637 | A |   | 3/1961  | Burdick     |          |
| 3,320,750 | A | * | 5/1967  | Haise et al. | 405/37  |
| 3,870,085 | A | * | 3/1975  | Schneider   | 138/93   |
| 4,417,598 | A | * | 11/1983 | DePirro     | 137/2    |
| 4,660,644 | A | * | 4/1987  | Egnor       | 166/285  |
| 4,964,439 | A | * | 10/1990 | Vanderlans  | 138/93   |
| 5,240,031 | A | * | 8/1993  | Vigil       | 137/315.01 |
| 5,300,047 | A | * | 4/1994  | Beurrier    | 604/264  |
| 5,341,839 | A |   | 8/1994  | Kobayashi et al. |     |
| 5,503,188 | A | * | 4/1996  | Petrone     | 138/93   |
| 5,771,937 | A | * | 6/1998  | Collins     | 138/93   |
| 5,867,547 | A | * | 2/1999  | Lee         | 376/204  |
| 6,082,925 | A | * | 7/2000  | Raasch      | 404/2    |
| 6,263,896 | B1 | * | 7/2001 | Williams    | 137/15.15 |
| 6,351,985 | B1 | * | 3/2002 | Bedwell     | 73/49.8  |
| 6,374,846 | B1 | * | 4/2002 | DeSmet      | 137/15.01 |
| 6,446,669 | B1 | * | 9/2002 | Lundman     | 138/91   |
| 6,502,603 | B2 | * | 1/2003 | Lane, Jr.   | 138/89   |
| 6,959,734 | B2 |   | 11/2005 | Lundman    |          |
| 7,073,535 | B1 | * | 7/2006 | Warmerdam   | 138/93   |
| 7,357,146 | B2 | * | 4/2008 | Beaty       | 137/172  |
| 7,455,077 | B2 | * | 11/2008 | Lundman    | 138/93   |
| 7,597,118 | B1 | * | 10/2009 | Peterson et al. | 138/93 |
| 8,636,035 | B2 | * | 1/2014 | Lundman     | 138/93   |
| 2004/0003855 | A1 | * | 1/2004 | Dees et al. | 138/93  |
| 2006/0042695 | A1 | * | 3/2006 | Gonia      | 137/487.5 |
| 2006/0102266 | A1 |   | 5/2006 | Ravasio et al. |      |

OTHER PUBLICATIONS

Flow Stop Model Brochure, printed from website www.flowstop.net on Oct. 1, 2012 (2009 date on copyright notice).

* cited by examiner

*Primary Examiner* — William McCalister
(74) *Attorney, Agent, or Firm* — Thomas L. Crisman (57) ABSTRACT

A fluid flow regulator adapted to be inserted into a conduit and inflated to form a leak tight sealing contact with the interior wall of the conduit. The fluid flow regulator includes a toroidal inflatable member mounted on a cylindrical annular mount which attaches to a flow-through pipe. The fluid flow regulator also includes a fluid flow control valve within the inner portion of the toroidal inflatable member which can be opened and closed to control the flow of fluid from the reservoir through the conduit.

9 Claims, 6 Drawing Sheets

APPARATUS FOR REGULATING FLUID FLOW FROM A RESERVOIR

TECHNICAL FIELD

The present application relates generally to a device and system that controls the level of a body of water in a reservoir by controlling the flow of water from a conduit leading from the reservoir. More specifically, the invention is directed to an inflatable member closing the exhaust end of a reservoir drain conduit coupled with a pressure controlled valve that allows for automatic regulation of water flow from the conduit.

BACKGROUND

Water reservoirs typically strive to retain maximum water levels when those reservoirs are employed either for storage and use in irrigation, for livestock or to exploit the potential energy of the stored water. Reservoirs often have fixed crests and natural inflows from streams, precipitation etc. Any increased inflow into a reservoir may cause undesirable flooding upstream of the reservoir and/or over load the retention walls adjacent the reservoir. Many devices have been used in the past to regulate reservoir outflow to compensate for inflow variations. One such device is commercially available under the brand name "Flow Stop". Flow Stop is an inflatable pipe plug used to service non-pressurized pipes. This inflatable plug has a smooth lateral exterior surface and consequently, offers very little frictional engagement with the walls of the pipe. If such a plug is used in highly pressurized pipes, there is a possibility of slippage of the plug and its consequent disengagement from the exhaust conduit resulting in a potentially disastrous outflow from the reservoir. Moreover, under wet conditions, a lubricating film of water between the outer surface of this prior art inflatable pipe plug and the inner surface of the pipe further exacerbates the lack of frictional engagement.

In addition, U.S. Pat. No. 6,959,734 discloses a flow-through inflatable plug assembly axially positioned in a pipeline. The flow-through inflatable plug assembly includes a flow-through fluid conduit and a separate donut shaped inflatable member defining an aperture. In operation, the flow-through fluid conduit is inserted into the aperture of the inflatable member and, when the flow-through inflatable plug assembly is inserted into a pipeline and inflated, the inflatable member fills the void between the inner diameter of the pipeline and the outer diameter of the flow-through fluid conduit. Thus, the flow-through fluid conduit is sealably captured in the axial aperture so that fluid flow in the pipeline is limited to passage through the flow-through fluid conduit.

Whatever the merits of the previously described devices, none of them fully achieve the advantages of the current invention. Accordingly, it is a principle object of the invention to provide a novel, simple, portable device with excellent frictional engagement mechanism that when installed in a fluid passageway will automatically regulate the water in response to changes in fluid pressure.

SUMMARY

The present invention provides a device and system that controls the level of a body of water in a reservoir by controlling the flow of water from a conduit leading from the reservoir. More particularly, in one embodiment of the invention the device to regulate fluid flow from the reservoir includes an inflatable member of generally toroidal shape formed of flexible elastomer material having a pair of side walls and a pair of beads at the radially inner edge of each of said side walls. The lateral circumferential surface of said toroidal inflatable member is substantially planar with a plurality of circumferentially extending grooves transversally spaced from one another, while the lateral surface of the inflatable member is configured to be in a leak tight sealing contact with the interior wall of the conduit when inflated. The inflatable member is mounted on to a cylindrical annular mount having a circular ring with a pair of radially outwardly extending flanges, located axially inward from each flange is a well designed to sealingly engage the pair of beads to ensure said inflatable member holds air without leakage. Further, a cylindrical flow-through pipe has a first end and a second end, each end having radially extending flanges. The first end of said flow-through pipe is secured to the flange of the annular mount. Also included is an inflation control valve disposed in one of the side walls of the inflatable member and extending radially outwardly of the sealed arrangement between one of the flanges of the annular mount and one of the flanges of flow-through pipe.

Means are included to measure the pressure of the fluid along with a valve to release the fluid upon reaching a threshold pressure. In a preferred form of the invention, the pressure sensor is disposed within the fluid and the sensor is adapted to measure the pressure of fluid in the conduit and output a signal indicative of fluid pressure in the conduit to a pressure controlled valve positioned at the second end of the flow-through pipe. The valve is responsive to a signal from the pressure sensor and designed to open upon fluid in the conduit reaching a predetermined pressure level.

Another advantage of the fluid regulating system embodying the invention is that the elastomeric toroidal plug has a plurality of parallel circumferentially extending grooves formed in the outer cylindrical surface to increase the frictional engagement between the outer surface of the plug and the inner walls of the conduit to prevent fluid pressure from dislodging the plug from within the conduit at extreme pressure. In one embodiment, in addition to the grooves, a plurality of rubber buttons or teats are provided which serve as an additional traction inducing mechanism.

Various other features and advantages of the invention will be apparent by reference to the following description of the preferred embodiment, by reference to the drawings, and by reference to the claims.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

One example embodiment of the present invention and its potential advantages are understood by referring to FIGS. 1 through 9 of the drawings.

Figure 1:
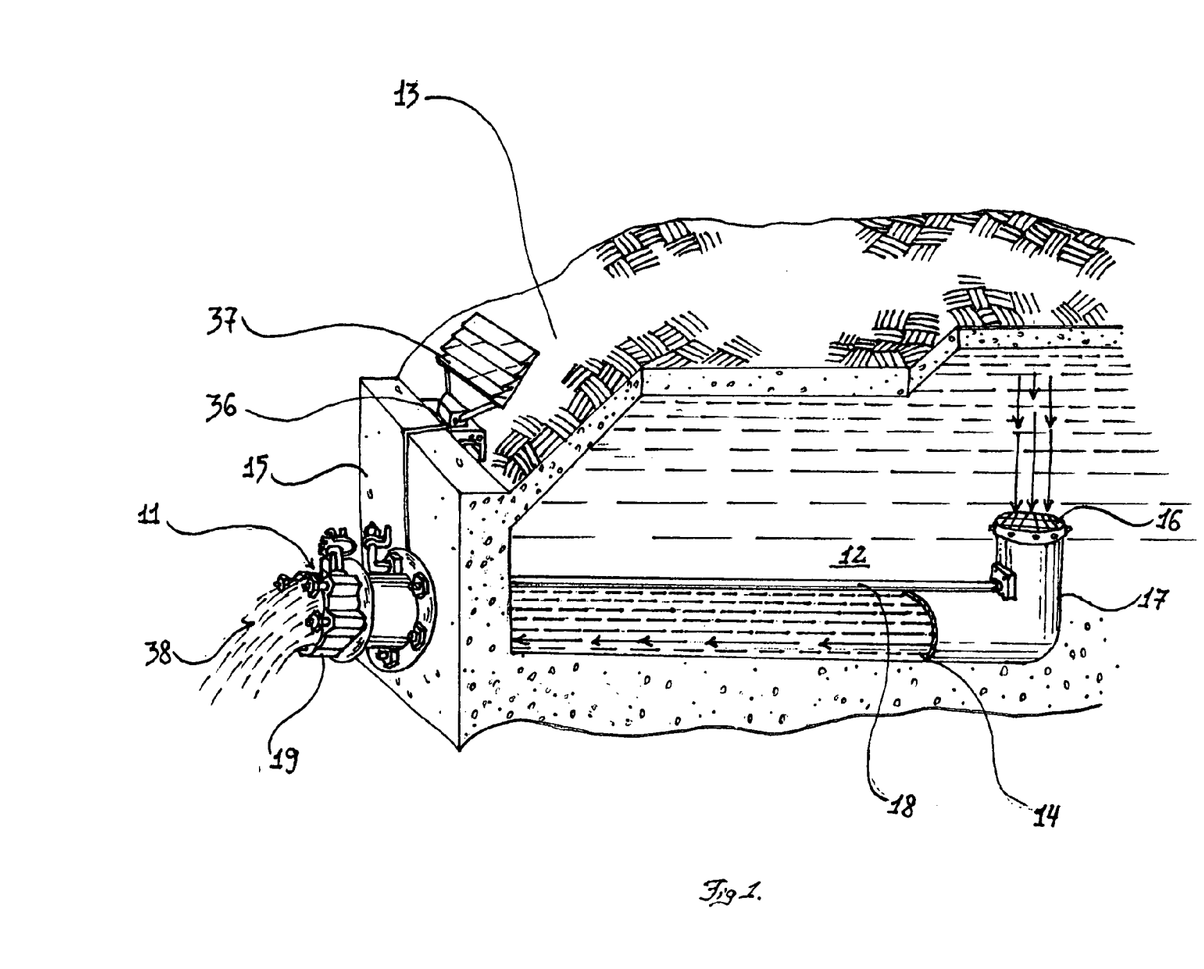
FIG. 1 is a general partially cut-away view of a water reservoir with one embodiment of the invention in use, including a partial cut-away view showing fluid flow through the conduit.
Figure 2:
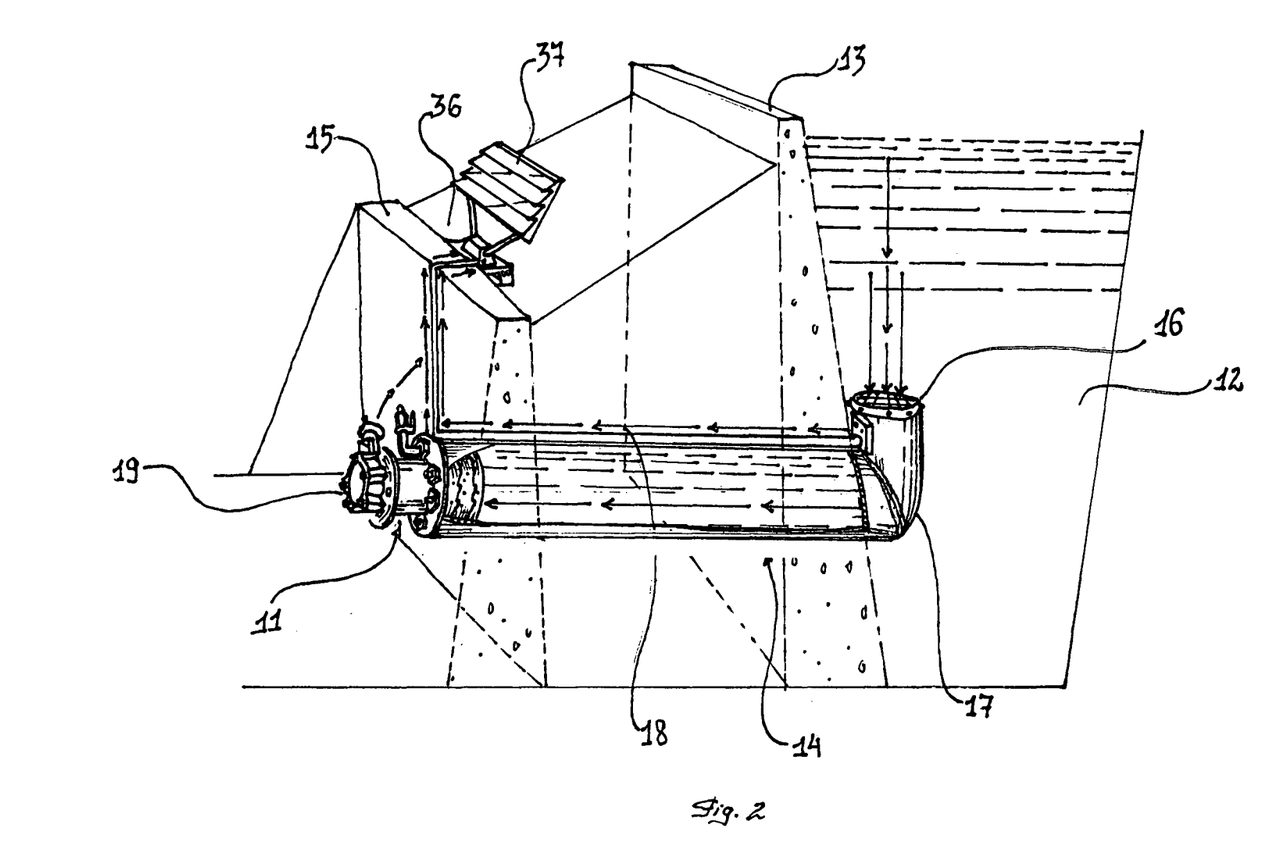
FIG. 2 is a close-up view similar to FIG. 1, showing fluid flow regulator inserted into the end of the conduit.
Figure 3:
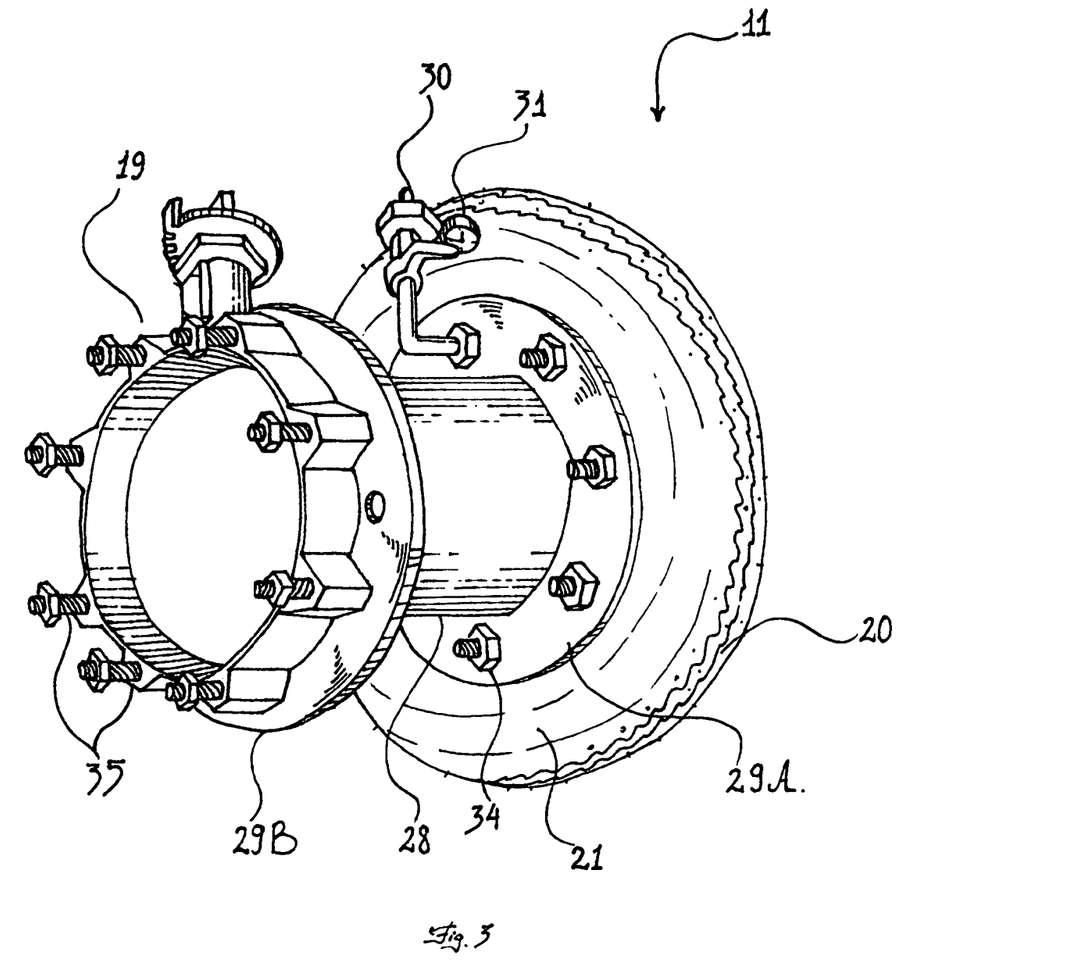
FIG. 3 is a perspective view of the fluid flow regulator embodying the invention.

FIG. 1 and FIG. 2 shows an environment in which a fluid flow regulator 11 constructed in accordance with one embodiment of the present invention may be used. In particular, FIGS. 1 and 2, indicate a reservoir 12 confined by a dam 13 which may be of earth, concrete, combination thereof or any other desired construction. While the present invention may be used in connection with any fluid reservoir, it is preferably used with reservoirs where water is held back by a suitable dam. As shown in FIGS. 1 and 2, means have been provided which will, in one aspect, automatically control the flow of water or other liquids without the attention of a workman. In one embodiment, a conduit 14 made of concrete, metal, PVC or other suitable material may be installed in the earth in a trench and covered with stone bedding and then a backfill material to give a solid, compact base to the conduit installation. FIG. 1 shows the conduit being supported on the bottom of the reservoir floor, however suitable support posts could also be used to hold the conduit 14 in position above the bottom of the reservoir 12. The conduit 14 extends from the reservoir 12 through a concrete buttress 15 above a fluid discharge area. The input end of the conduit 14 located within the reservoir 12 is closed by grid work 16 secured to the open end to prevent any debris from interfering with the functioning of the fluid flow regulator system 11. The output end of the conduit 14 terminates within a concrete buttress 15 forming part of the dam 13. An exemplary fluid flow regulator 11 is insertable into the output end of the conduit 14. The fluid flow regulator system 11 may have a pressure controlled solenoid valve 19 mounted to it which is designed to open when the fluid in the reservoir/conduit reaches a predetermined pressure. The pressure of the fluid, such as water is, of course, directly related to the height of the surface of the fluid in the reservoir above the point of pressure measurement within the conduit. In one embodiment, a pressure sensor 17 is mounted in the input end of the conduit in the reservoir. The pressure sensor 17 is adapted to measure the pressure of fluid and signal the measured pressure to the pressure controlled solenoid valve 19 via a cable embedded in a pipe 18 that runs along or through the conduit 14. In another embodiment, a pressure sensor 17 may be integrated with the pressure controlled solenoid valve 19. In yet another embodiment, the measured pressure is signaled wirelessly to the control unit 33 by employing a wireless transmitter and receiver (not shown). In yet a further embodiment, a signal to open or close the solenoid valve may be provided by a detector as simple as a float device that rises on the surface of the reservoir and provides a signal indicative of the water level and open the valve when the level exceeds a preselected level (also not shown).

FIG. 3, FIG. 4, FIG. 5, FIG. 6 and FIG. 7 shows different, detailed views and components of one embodiment of a fluid regulator system 11 constructed in accordance with one aspect of the invention. The fluid regulator system includes an inflatable elastomeric member 20 which is substantially toroidal in shape and may be rubber, plastic or similar material. The inflatable member 20 has a pair of side walls 21 with a pair of sealing beads 22. The lateral circumferential outer surface of the inflatable member has grooves 23 formed therein a substantially circumferential extending direction. The grooves 23 are laterally spaced from one another and may be, by way of example only, approximately 11 mm in depth and 7 mm in width. In order to prevent any leakage of the fluid in the conduit past the inflatable member there are no outer grooves that run perpendicular to the circumferential grooves 23. The bead portion 22 of the inflatable member 20 is positioned into a circumferential welt 24 of an elongated generally cylindrical metal annular member 25 to ensure that the inflatable member 20 holds air without leakage. The annular member 25 further has a pair of radially extending flanges 26A and 26B with the upper face of the flange 26B having plurality of axially extending bolts 27.

A flow-through pipe 28 with a pair of radially extending flanges 29A and 29B is connected to the annular member 25. The flange 29A of the flow-through pipe 28 is secured to the flange 26B of the annular member 25 with plurality of bolts 27 and nuts 34. One of the flanges 29A of the flow-through pipe 28 has a plurality of holes aligned to receive the bolts 27 of the annular member 25 while the other flange 29B has plurality of bolts 35 to receive and mount a pressure controlled solenoid valve 19. Although a partially cut-away view of a specific type of valve is show in FIG. 6, it is understood that any suitable valve including ball valve, gate valve or butterfly valve can be used. It is advantageous to use elastomeric seals between the annular member 25 and the flow-through pipe 28 and between the flow-through pipe 28 and the solenoid valve 19 to ensure leak free connections. For example, a rubber o-ring gasket seal may be used to seal the connection between the annular member 25 and the flow-through pipe 28. Solenoid valve seal materials like nitrile rubber can also be used between the flow-through pipe 28 and the solenoid valve 19. Depending on the particular fluid, the flow of which is being regulated, other seal materials like ethylene propylene diene monomer (EPDM) rubber can also be used.

An inflation control valve assembly 30 designed to inflate or deflate the inflatable member 20 with air is disposed into the side wall 21 of the inflatable member 20. The hole (not shown) in the flange 29A of the flow-through pipe 28 and the hole 39 in flange 26B of the annular member 25 are aligned to receive the inflation control valve assembly 30. After receiving the inflation control valve assembly the holes are sealed with appropriate seal. In one embodiment, an o-ring seal is used to provide an airtight seat between the holes and inflation control valve assembly 30. The inflation control valve 30 further includes a pressure gauge 31 that indicates the internal pressure of the inflatable member 20.

Figure 6:
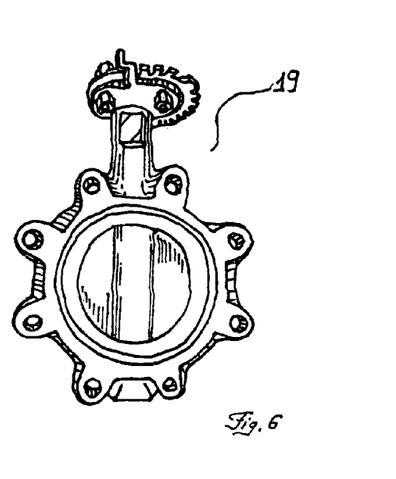
FIG. 6 is an end view of one of the alternative pressure controlled solenoid valves that can be used with the present invention.
Figure 7:
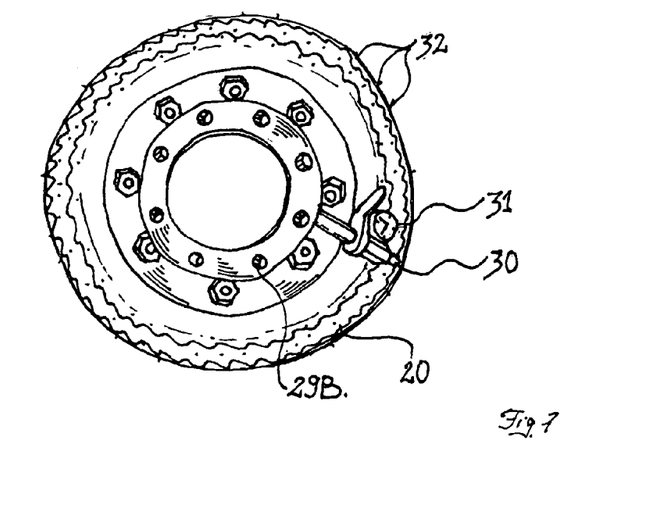
FIG. 7 is a front end view of the fluid flow regulator before the pressure controlled solenoid valve is installed.

FIG. 6 shows one embodiment of the valve assembly 19 prior to engagement with flange 29B of the flow-through pipe 28. Valve 19 can easily be replaced by any other suitable commercially available valve. FIG. 7 shows the end view of the fluid flow regulator 11 before the pressure controlled solenoid valve 19 is installed.

Figure 4:
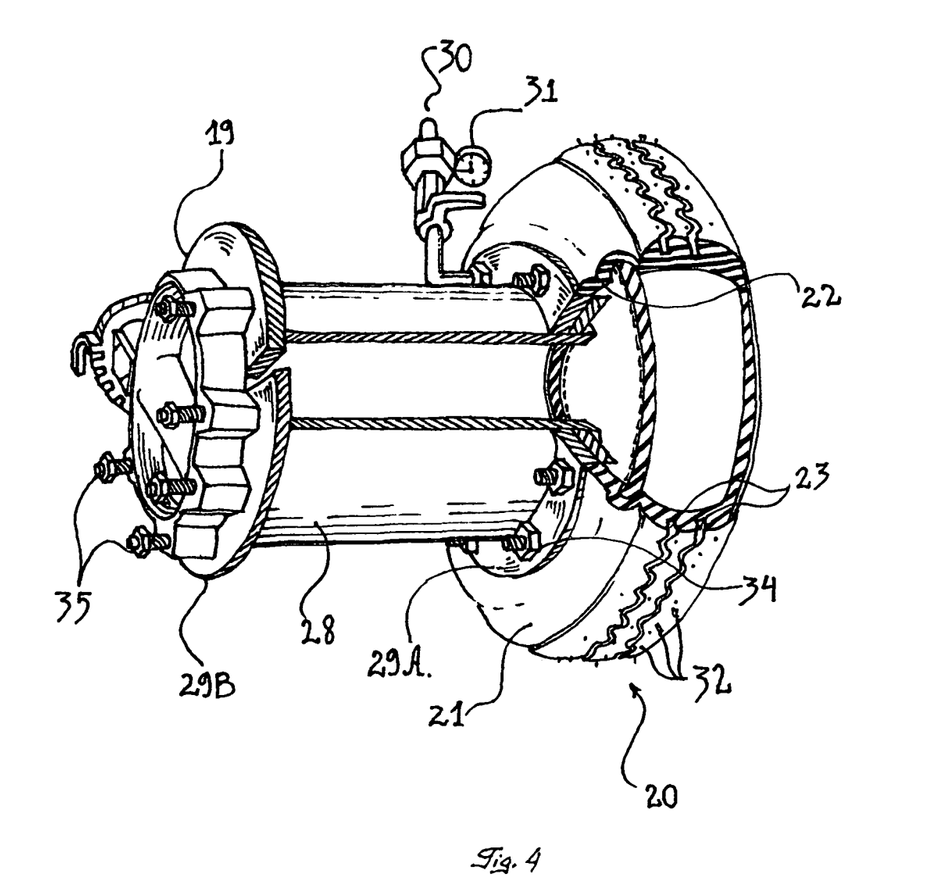
FIG. 4 is a partial cut-away view of fluid flow regulator shown in FIG. 3.
Figure 5:
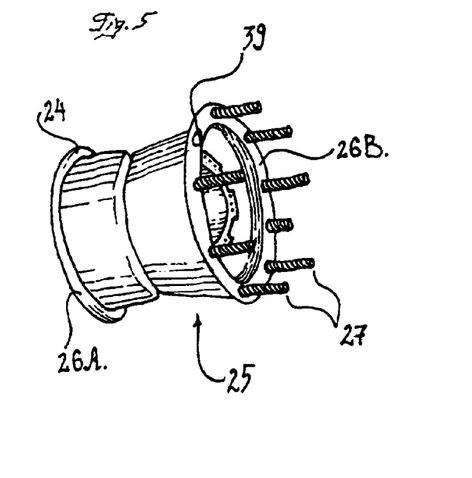
FIG. 5 is a side perspective view of the elongated annular member of the fluid flow regulator illustrating a pair of flanges, one of the flanges having plurality of bolts.

FIG. 4 in particular illustrates some of the illustrative mechanisms used in the present invention to improve the frictional engagement between the inflatable member 20 and the inner wall of a conduit which are lacking in the prior art devices. The lateral circumferential surface of the inflatable member 20 has a plurality of grooves 23 that form a tread pattern suitable for the purpose of imparting axial traction between the two engaging surfaces. In one embodiment, two to four grooves extend continuously about the lateral surface in a circumferential direction. These grooves 23 are substantially parallel to and axially spaced from one another. They may be straight or zig-zaged in configuration. In one embodiment, both the width and depth of the grooves 23 was 0.3 inches. It is also contemplated to be within the scope of the invention that the depth and width are not equal to one another. In addition to the grooves 23, a plurality of rubber buttons or teats 32 are provided which serve as an additional traction inducing mechanism. In one embodiment, the width of the outer surface of the inflatable member 20 in the axial direction was 10 inches and the rubber buttons 32 have a radius of between 0.2 to 0.4 cms and are interspersed between and on either side of the grooves 23.

Figure 8:
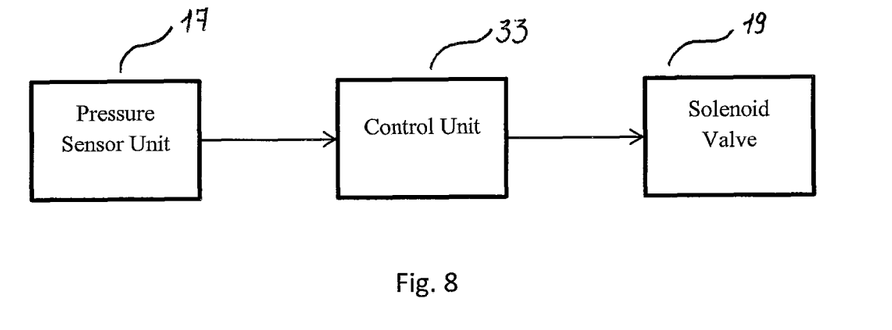
FIG. 8 is a Hock diagram showing one embodiment of the electric control unit of the fluid flow regulator system as connected to associated components.
Figure 9:
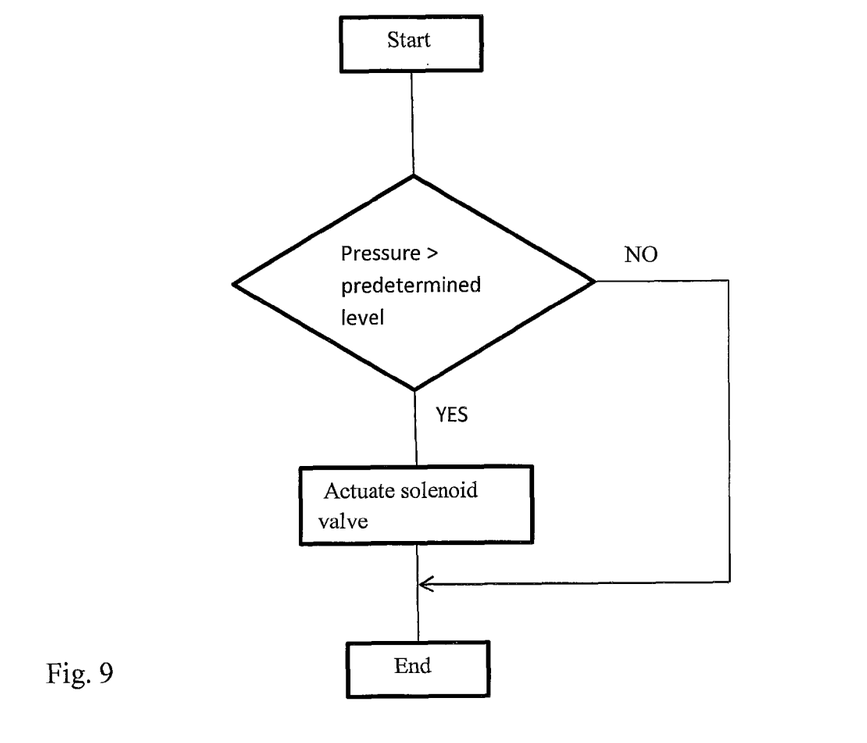
FIG. 9 is a flow chart showing the function performed by the electric control unit to actuate the pressure controlled solenoid valve according to the detected fluid pressure in the reservoir in accordance with one embodiment of the invention.

FIG. 8 is a block diagram that illustrates the functioning of the pressure controlled solenoid valve 19 in one embodiment of the invention. The pressure sensor unit 17 may be either integrated into the pressure controlled solenoid valve 19 or disposed in the opening of the conduit 14 in the reservoir. Any conventional, commercially available pressure sensor, for example with a pressure range of 10 psi to 60 psi, is suitable. The measured pressure of the fluid in the reservoir is transmitted at regular intervals to the control unit, which in turn actuates the solenoid valve 19 in response to a preselected algorithm. An exemplary algorithm is illustrated in FIG. 9. In one embodiment, the measured pressure was transmitted to the control unit 33 every 2 hours. The control unit 33 cyclically performs the function as shown in flowchart of FIG. 9 to see if the pressure detected b the pressure sensor exceeds a predetermined level. If this is the case, the control unit energizes the solenoid valve for a period of time ranging from one to two hours, for example, or until the pressure falls below a selected value as determined by the control algorithm. The pressure controlled solenoid valve may be powered by a rechargeable battery pack 36 that is recharged with electric power generated by a solar panel 37 positioned on top of the concrete buttress 15.

In operation, the reservoir 12 contains a body of water bounded by the dam 13. An exemplary embodiment of the current invention is used to regulate the depth of water in the reservoir in response to an increased inflow of water. The fluid regulator system 11 in a deflated state is insertable into discharge end of the conduit 14. The conduit 14 can be an irrigation pipeline, wastewater pipeline, drainage pipeline, oil pipeline and the like. Once inserted, the fluid regulator system 11 is inflated via inflation control valve 30 to a pressure of 60 psi, for example. The grooves 23 and/or rubber buttons 32 on the outer lateral cylindrical surface of the inflatable member are designed to provide secure frictional engagement with the inner surface of the conduit. In situations where the inner surface of the conduit 14 is very smooth, tight sealing contact with the interior surface of the conduit can be ensured by applying a sealant material to the lateral surface of the inflatable member. An example of an advantageous seal is one made of butyl rubber compounds.

In use, when the inflow into the reservoir 12 increases and reaches a value above a predetermined level, any resulting increase in pressure above that level will trigger the operation of fluid regulator system 11. Regulating fluid flow from the reservoir through the conduit maintains a desired level of water in the reservoir. Pressure of water per foot of depth at sea level is about 0.43 to 0.44 psi. For each additional 10 feet of water, pressure increases by about 4.3 to 4.4 psi. In one embodiment the depth of the water in the reservoir above the point of pressure measurement was about 40 feet, resulting in a pressure at that point of about 17.5 psi. The control unit 33 of pressure controlled solenoid valve 19 was programmed to actuate the valve when the pressure at the sensor reached 22 psi. Thus the pressure sensor signaled to the control unit a pressure reading of 22 psi when the water level above the sensor reached about 50 feet. In response to receiving a pressure reading equal to the configured range, the control unit 33 actuated the valve 19 for a preset amount of time. Embodiments of the fluid regulator system 11 described above are adaptable to have overall inflation diameters between about 10 inches and 60 inches and are capable of inflation pressures up to about 75 pounds per square inch (psi). Additional inflation diameters and pressures may be achieved by adjusting various components of the fluid regulator system.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A device to control fluid flow through a conduit, the device comprising:
   an inflatable member of toroidal shape formed of flexible elastomer material having a pair of side walls and a pair of beads at the radially inner edge of each of said side walls, the lateral circumferential surface of said toroidal inflatable member being planar with a plurality of circumferentially extending grooves transversally spaced from one another, the lateral surface of said inflatable member configured to be in a leak tight sealing contact with the interior wall of the conduit when inflated;
   a cylindrical annular mount for said inflatable member having a circular ring with flanges designed to sealingly engage said pair of beads to ensure said inflatable member holds air without leakage;
   a cylindrical flow-through pipe having a first end and a second end, each end having radially extending flanges, the first end of said flow-through pipe secured to one of the flanges of said annular mount;
   an inflation control valve assembly disposed into one of the side walls of said inflatable member and extending radially outwardly of the sealed arrangement between the one of the flanges of the annular mount and one of the flanges of flow-through pipe;
   a pressure sensor disposed within the fluid, said sensor adapted to measure the pressure of fluid in the conduit and output a signal indicative of fluid pressure in the conduit; and
   a pressure controlled solenoid valve positioned at said second end of said flow-through pipe, said valve being responsive to a signal from said pressure sensor and being designed to open upon fluid in the conduit reaching a predetermined pressure level.

2. Device of claim 1, further comprising a sealant positioned about a portion of the lateral surface of the inflatable member, where in the sealant inhibits fluids in the conduit from leaking out.

3. Device of claim 1, wherein the inflatable member has an inflation diameter between 10 inches and 60 inches.

4. Device of claim 1, wherein the pressure controlled solenoid valve is selected from the group consisting of butterfly valve, gate valve and ball valve.

5. Device of claim 1, wherein the measured pressure is signaled to the pressure controlled solenoid valve via a cable.

6. Device of claim 1, wherein the measured pressure is signaled to the pressure controlled solenoid valve wirelessly.

7. Device of claim 1, wherein the grooves are 11 mm in depth and 7 mm in width.

8. Device of claim 1, wherein the lateral circumferential surface of said toroidal inflatable member includes a plurality of small radially extending buttons to frictionally engage the inner walls of the conduit.

9. Device of claim 8, where in the buttons have a radius of between 0.2 to 0.4 cms.

* * * * *